US012063495B2

(12) United States Patent
Taguchi

(10) Patent No.: US 12,063,495 B2
(45) Date of Patent: Aug. 13, 2024

(54) SIGNAL PROCESSING APPARATUS, SIGNAL PROCESSING METHOD, AND SIGNAL PROCESSING SYSTEM

(71) Applicant: SONY GROUP CORPORATION, Tokyo (JP)

(72) Inventor: Kazuaki Taguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 156 days.

(21) Appl. No.: 17/642,073

(22) PCT Filed: May 8, 2020

(86) PCT No.: PCT/JP2020/018651
§ 371 (c)(1),
(2) Date: Mar. 10, 2022

(87) PCT Pub. No.: WO2021/053874
PCT Pub. Date: Mar. 25, 2021

(65) Prior Publication Data

US 2022/0386057 A1 Dec. 1, 2022

(30) Foreign Application Priority Data

Sep. 19, 2019 (JP) ................................ 2019-170067

(51) Int. Cl.
*H04S 7/00* (2006.01)
*H04R 5/04* (2006.01)

(52) U.S. Cl.
CPC ................ *H04S 7/30* (2013.01); *H04R 5/04* (2013.01); *H04S 2420/13* (2013.01)

(58) Field of Classification Search
None
See application file for complete search history.

(56) References Cited

U.S. PATENT DOCUMENTS

2008/0219484 A1 9/2008 Strauss et al.
2016/0088393 A1 3/2016 Miyasaka et al.

FOREIGN PATENT DOCUMENTS

AT 386414 T 3/2008
CN 101223819 A 7/2008
(Continued)

OTHER PUBLICATIONS

International Search Report and Written Opinion of PCT Application No. PCT/JP2020/018651, issued on Jul. 21, 2020, 11 pages of ISRWO.

(Continued)

*Primary Examiner* — Kenny H Truong
(74) *Attorney, Agent, or Firm* — CHIP LAW GROUP

(57) ABSTRACT

A signal processing apparatus includes: an audio signal processing unit configured to perform wavefront synthesis processing for at least part of a plurality of sound source data; a first output unit configured to output N-channel audio signals output from the audio signal processing unit to a first speaker device; a mix processing unit configured to mix the N-channel audio signals output from the audio signal processing unit; and a second output unit configured to output an audio signal output from the mix processing unit to a second speaker device, in which a setting regarding an output of the second speaker device is possible.

12 Claims, 14 Drawing Sheets

(56) References Cited

FOREIGN PATENT DOCUMENTS

| | | | | |
|---|---|---|---|---|
| CN | 105264914 | A | | 1/2016 |
| CN | 106961645 | A | | 7/2017 |
| CN | 106961647 | A | | 7/2017 |
| DE | 102005033238 | A1 | | 1/2007 |
| EP | 1782658 | A1 | | 5/2007 |
| JP | 2009501463 | A | | 1/2009 |
| JP | 4745392 | B2 | | 8/2011 |
| JP | 2012004655 | A | * | 1/2012 |
| JP | 5660808 | B2 | | 1/2015 |
| JP | 2016-100613 | A | | 5/2016 |
| WO | 2007/009599 | A1 | | 1/2007 |
| WO | 2014/199536 | A1 | | 12/2014 |

OTHER PUBLICATIONS

Corteel, et al., “3D speaker management systems—Mixer integration concepts”, Plusmusic, XP055641826, Nov. 30, 2014.

* cited by examiner

SIGNAL PROCESSING APPARATUS, SIGNAL PROCESSING METHOD, AND SIGNAL PROCESSING SYSTEM

CROSS REFERENCE TO RELATED APPLICATIONS

This application is a U.S. National Phase of International Patent Application No. PCT/JP2020/018651 filed on May 8, 2020, which claims priority benefit of Japanese Patent Application No. JP 2019-170067 filed in the Japan Patent Office on Sep. 19, 2019. Each of the above-referenced applications is hereby incorporated herein by reference in its entirety.

TECHNICAL FIELD

The present disclosure relates to a signal processing apparatus, a signal processing method, and a signal processing system.

BACKGROUND ART

A wavefront synthesis technology is known as a sound field reproduction technique of collecting a sound wavefront of audio in a sound field with a plurality of microphones and reproducing the sound field on the basis of an obtained collected sound signal (for example, see PTL 1 below).

CITATION LIST

Patent Literature

[PTL 1]
JP 2016-100613A

SUMMARY

Technical Problem

Generally, in this field, it is desirable to reproduce an audio signal without impairing low frequency components of the audio signal as much as possible, and to enable various settings regarding reproduction (output) of the audio signal.

It is desirable to provide a signal processing apparatus, a signal processing method, and a signal processing system capable of performing various settings regarding reproduction (output) of an audio signal while suppressing impairment of low frequency components in the entire sound field as much as possible.

Solution to Problem

The present disclosure is, for example, a signal processing apparatus including:

an audio signal processing unit configured to perform wavefront synthesis processing for at least part of a plurality of sound source data;

a first output unit configured to output N-channel audio signals output from the audio signal processing unit to a first speaker device;

a mix processing unit configured to mix the N-channel audio signals output from the audio signal processing unit; and a second output unit configured to output an audio signal output from the mix processing unit to a second speaker device, in which a setting regarding an output of the second speaker device is possible.

Furthermore, the present disclosure is, for example, a signal processing method including:

by an audio signal processing unit, performing wavefront synthesis processing for at least part of a plurality of sound source data;

by a first output unit, outputting N-channel audio signals output from the audio signal processing unit to a first speaker device;

by a mix processing unit, mixing the N-channel audio signals output from the audio signal processing unit; and by a second output unit, outputting an audio signal output from the mix processing unit to a second speaker device, in which a setting regarding an output of the second speaker device is possible.

Furthermore, the present disclosure is, for example, a signal processing system including:

a first speaker device;

a second speaker device; and a signal processing apparatus to which the first speaker device and the second speaker device are connected, in which the signal processing apparatus includes an audio signal processing unit configured to perform wavefront synthesis processing for at least part of a plurality of sound source data, a first output unit configured to output N-channel audio signals output from the audio signal processing unit to the first speaker device, a mix processing unit configured to mix the N-channel audio signals output from the audio signal processing unit, and a second output unit configured to output an audio signal output from the mix processing unit to the second speaker device, and a setting regarding an output of the second speaker device is possible.

DESCRIPTION OF EMBODIMENTS

Hereinafter, an embodiment and the like of the present disclosure will be described with reference to the drawings. Note that the description will be given in the following order.

<Wavefront Synthesis Technology>

Embodiment

<Modification>

An embodiment and the like to be described below are favorable specific examples of the present disclosure, and content of the present disclosure is not limited to the embodiment and the like.

<Wavefront Synthesis Technology>

First, to facilitate understanding of the present technology, an acoustic technology called a wavefront synthesis technology will be described. In recent years, a wavefront synthesis technology for enabling a new acoustic experience using a speaker array configured by multi-channel speakers has attracted attention. This wavefront synthesis technology is a technology (wavefront synthesis processing) of physically controlling a wavefront of a sound in a space by controlling amplitude and phase of each speaker in the speaker array.

Figure 1A:
FIGS. 1A and 1B are diagrams that are referred to when describing an example of a wavefront synthesis technology.
Figure 1B:
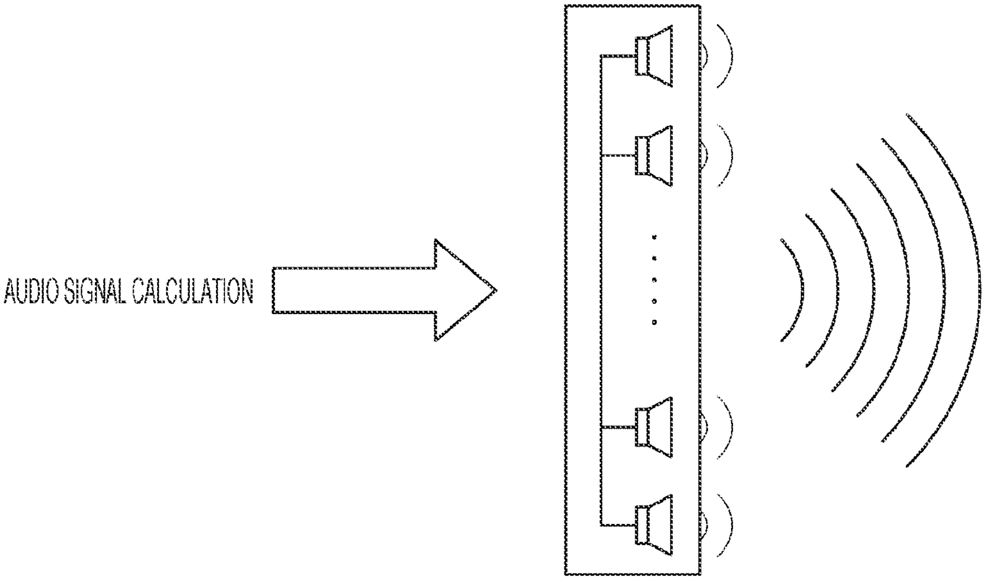

Processing performed in a signal processing apparatus that implements the wavefront synthesis technology will be schematically described with reference to FIGS. 1A and 1B. Sound source data is input to the signal processing apparatus. Sound source metadata includes sound data itself and metadata describing a reproduction position (position information), a gain, and the like of the sound data. Such sound source data is also referred to as object audio, and is defined for each object (for example, for each instrument or animal) corresponding to a sound source. The signal processing apparatus to which the sound source data has been input calculates a reproduction signal. For example, the signal processing apparatus compares the reproduction position included in the sound source data with the position of the speaker array in real time, and calculates from which speaker the sound data of each object is to be reproduced on the basis of how much of amplitude, phase, and the like, thereby obtaining a speaker signal for driving the speaker. Then, as illustrated in FIG. 1B, the obtained speaker signal is reproduced from a corresponding speaker. A synthesized sound field is formed by a sound reproduced from the speakers, and reproduction of the sound by wavefront synthesis is performed.

By the way, since the multi-channel speakers are used to reproduce the audio signal to which the wavefront synthesis processing has been applied, the diameter of each speaker is generally small (for example, about 4 cm). The ability to reproduce a low frequency is limited due to the small diameter of the speaker. When the audio signal including the low frequency is reproduced from the speaker with the small diameter as described above, there is a possibility that no sound or abnormal sound is reproduced. Therefore, it is conceivable to cut a low frequency component of the audio signal to be reproduced in advance, but this method can prevent generation of abnormal sound yet lacking the feelings of a low frequency of a reproduced sound. Furthermore, it is favorable to make various settings settable regarding outputs of multi-channel audio signals. An embodiment will be described in detail while taking the above point into consideration.

Embodiment

Figure 2:
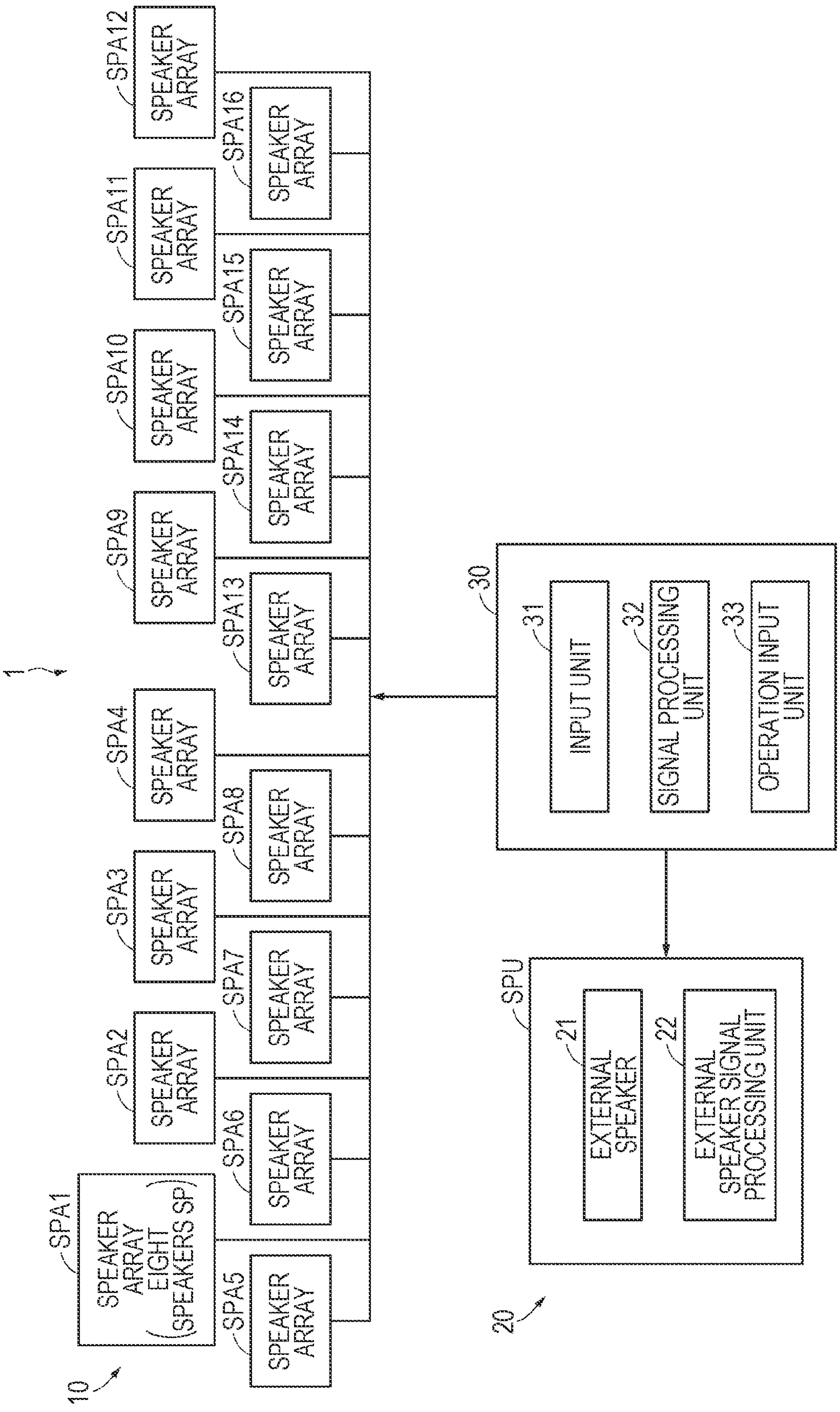
FIG. 2 is a diagram that is referred to when describing a configuration example of a signal processing system according to an embodiment of the present disclosure.

FIG. 2 is a diagram for describing a configuration example of a signal processing system (signal processing system 1) according to an embodiment of the present disclosure. The signal processing system 1 includes, for example, a first speaker device 10, a second speaker device 20, and a signal processing apparatus 30 that can be connected to the first speaker device 10 and the second speaker device 20 wiredly or wirelessly. FIG. 2 illustrates a state in which the first speaker device 10 and the second speaker device 20 are connected to the signal processing apparatus 30 by a wire (a cable).

(First Speaker Device)

The first speaker device 10 (also referred to as an active speaker) includes a plurality of speaker arrays. In the present embodiment, the first speaker device 10 includes sixteen speaker arrays (speaker arrays SPA1, SPA2, . . . , and SPA16). Note that, in a case where there is no need to distinguish individual speaker arrays, the speaker arrays are collectively referred to as a speaker array SPA. The speaker array SPA includes, for example, eight speakers SP. A channel (ch) number is assigned to each speaker SP. For example, channel numbers 1ch to 8ch are assigned to the eight speakers SP of the speaker array SPA1, and channel numbers 9ch to 16ch are assigned to the eight speakers SP of the speaker array SPA2. Channel numbers are similarly assigned to the speakers SP included in the speaker array SPA3 and the subsequent speaker arrays SPA.

The first speaker device 10 can reproduce N-channel audio signals. Specifically, in the present embodiment, the first speaker device 10 can reproduce 128ch (8×16) audio signals. The 128 speakers SP are supported by, for example, a bar extending in a horizontal direction. As described above, the speaker SP is a speaker with a relatively small diameter (for example, 4 cm). From the first speaker device 10, sound data included in sound source data to which wavefront synthesis processing has been applied is reproduced.

(Second Speaker Device)

The second speaker device 20 includes an external speaker unit SPU. Although FIG. 2 illustrates one external speaker unit SPU, the second speaker device 20 may include a plurality of external speaker units SPU. The number of connected external speaker units SPU corresponds to the number of channels (X channels) of the second speaker device 20. The external speaker unit SPU includes an external speaker 21 and an external speaker signal processing unit 22. The external speaker signal processing unit 22 performs filter processing (processing by a low-pass filter) of limiting a band of an audio signal supplied from the signal processing apparatus 30 to a predetermined frequency (for example, 200 Hz) or lower, digital to analog (DA) conversion processing, amplification processing, and the like. The audio signal processed by the external speaker signal processing unit 22 is reproduced from the external speaker 21. Thus, the second speaker device 20 is used as a woofer.

The first speaker device 10 and the second speaker device 20 may be arranged such that sound emission surfaces face each other or may be arranged such that the sound emission surfaces face the same direction. In the case where the first speaker device 10 and the second speaker device 20 are arranged such that the sound emission surfaces face the same direction, the respective speaker devices may be arranged such that the sound emission surfaces become the same surface or the respective speaker devices may be arranged such that the sound emission surfaces are shifted from each other in a depth direction with respect to a listening position.

(Signal Processing Apparatus)

The signal processing apparatus 30 includes, for example, an input unit 31, a signal processing unit 32, and an operation input unit 33. A plurality of sound source data is input to the input unit 31. The sound source data may be supplied to the input unit 31 from a recording medium such as a semiconductor memory or an optical disk or the sound source data may be supplied via a network such as the Internet or a wireless local area network (LAN).

At least a part of the plurality of sound source data input to the input unit 31 is target sound source data for the wavefront synthesis processing in which the wavefront synthesis processing is performed. The plurality of sound source data may include non-target sound source data for the wavefront synthesis processing in which no wavefront synthesis processing is performed. In general, an example of the target sound source data for the wavefront synthesis processing includes sound source data corresponding to an object with movement, and an example of the non-target sound source data for the wavefront synthesis processing includes sound source data of back ground music (BGM) such as a natural environmental sound or a spatial environmental sound such as a noise or a physical sound. In the present embodiment, description will be given on the assumption that the sound source data of an object is the target sound source data for the wavefront synthesis processing, and the sound source data of BGM sound source is the non-target sound source data for the wavefront synthesis processing, for convenience of description, Note that whether or not sound source data is the target sound source data for the wavefront synthesis processing, that is, whether or not sound source data is either the target sound source data or the non-target sound source data for the wavefront synthesis processing is set by a user, for example. Either the target sound source data or the non-target sound source data for the wavefront synthesis processing may be automatically set according to a frequency analysis result of the sound data included in the sound source data or the like. Furthermore, there are sound source data of an object without movement or of an object with a small movement amount among sound source data of objects. Sound source data of such an object may be set as the non-target sound source data for the wavefront synthesis processing. Conversely, the sound source data of BGM sound source may include sound source data set as the target sound source data for the wavefront synthesis processing. Whether the target sound source data or the non-target sound source data for the wavefront synthesis processing is described in the metadata included in the sound source data, for example.

The signal processing unit 32 performs predetermined signal processing for the plurality of sound source data supplied from the input unit 31. Details of the processing performed by the signal processing unit 32 will be described below.

The operation input unit 33 is a general term for configurations for performing operation input. The operation input unit 33 includes a graphical user interface (GUI) in addition to physical configurations such as buttons, dials, and levers. For example, setting information is generated by an operation on the operation input unit 33. Details of the setting information will be described below.

Figure 3:
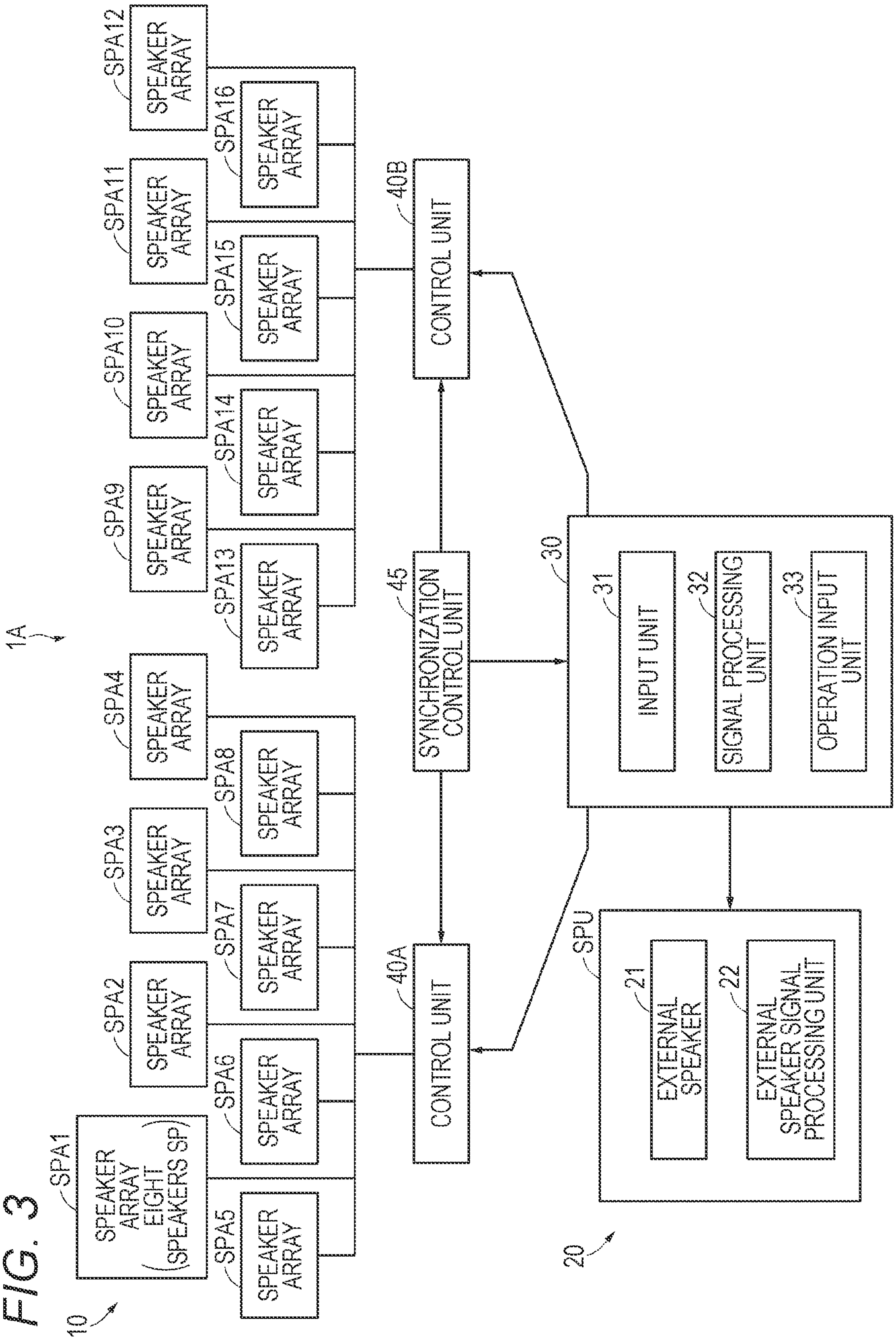
FIG. 3 is a diagram that is referred to when describing another configuration example of the signal processing system.

Note that the configuration of the signal processing system 1 can be changed as appropriate. For example, as illustrated in FIG. 3, a signal processing system (signal processing system 1A) may have a configuration including a control unit 40A that distributes audio signals to the first half speaker arrays SPA1 to SPA8 of the speaker arrays SPA, and a control unit 40B that distributes audio signals to the remaining speaker arrays SPA9 to SPA16. Each control unit is connected to the signal processing apparatus 30. In the case of such a configuration, a synchronization control unit 45 that synchronizes operations of the control units 40A and 40B is connected to the control units.

[Details of Signal Processing Unit]

(Configuration Example of Signal Processing Unit)

Figure 4:
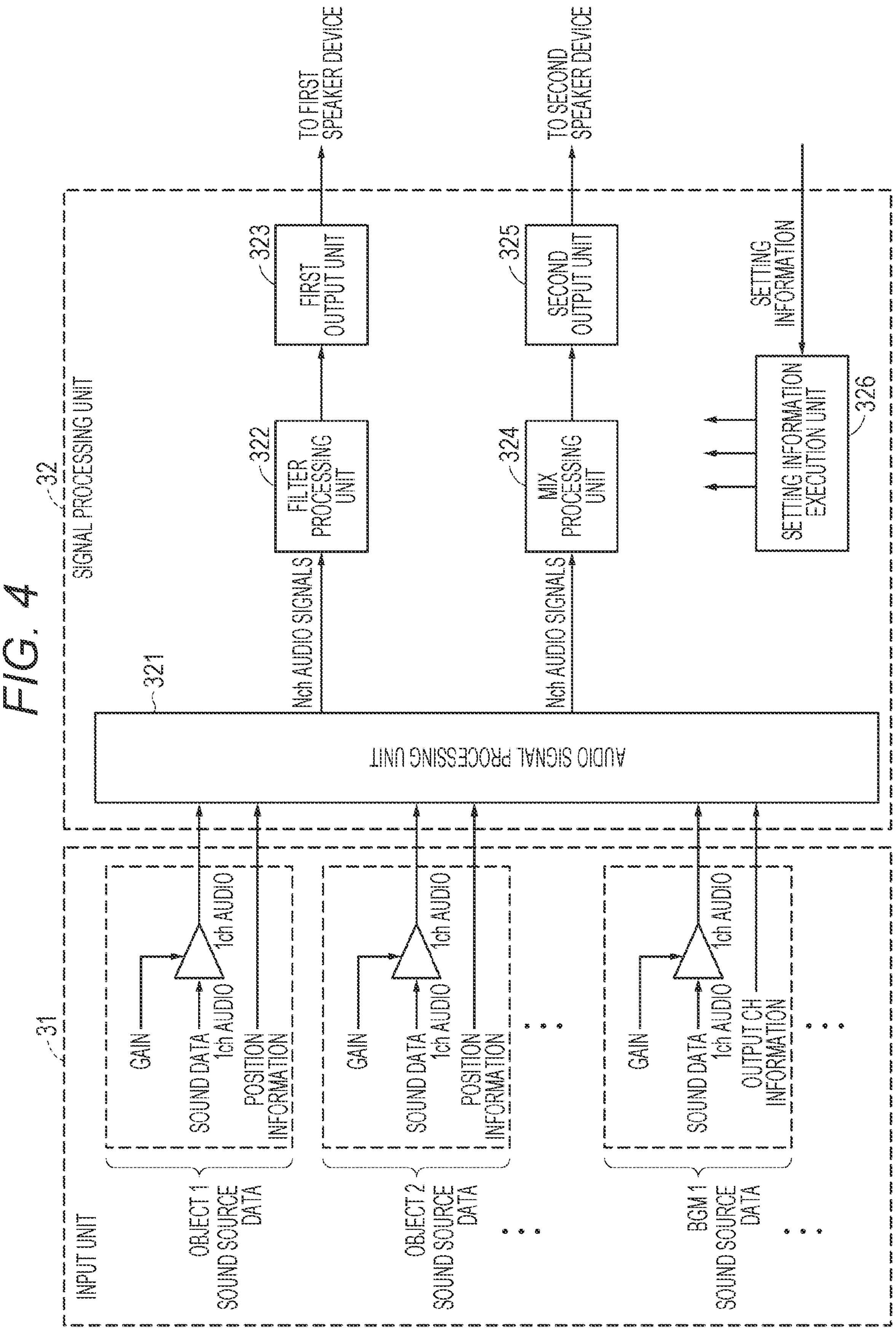
FIG. 4 is a diagram that is referred to when describing a configuration example of a signal processing unit according to an embodiment of the present disclosure.

Next, the signal processing unit 32 will be described in detail with reference to FIG. 4. As illustrated in FIG. 4, the signal processing unit 32 includes an audio signal processing unit 321. Furthermore, the signal processing unit 32 includes a filter processing unit 322 and a first output unit 323 as a system corresponding to the first speaker device 10. Furthermore, the signal processing unit 32 includes a mix processing unit 324 and a second output unit 325 as a system corresponding to the second speaker device 20. Furthermore, the signal processing unit 32 includes a setting information execution unit 326.

The sound source data is supplied to the audio signal processing unit 321 via the above-described input unit 31. The sound source data of an object includes the sound data itself and the metadata such as the position information. The sound data is monaural (1ch) audio data. Sound data obtained by performing predetermined gain adjustment for the sound data is supplied together with the position information corresponding to the sound data to the audio signal processing unit 321. The sound source data of BGM includes the sound data itself and the metadata such as output channel information. The sound data is monaural (1ch) audio data. Sound data obtained by performing predetermined gain adjustment for the sound data is supplied together with the output channel information corresponding to the sound data to the audio signal processing unit 321.

The audio signal processing unit 321 performs predetermined audio signal processing for the supplied sound source data. For example, the audio signal processing unit 321 performs the wavefront synthesis processing for at least a part of the plurality of sound source data, specifically, the target sound source data for the wavefront synthesis processing. Specifically, the audio signal processing unit 321 calculates and determines the speaker SP from which the sound data is to be reproduced, of the individual speakers SP, and the amplitude, phase, and the like of the sound data to be reproduced in the speaker SP. Thus, the audio signal processing unit 321 functions as an object audio renderer. The audio signal processing unit 321 outputs the non-target sound source data for the wavefront synthesis processing without performing the wavefront synthesis processing. N-channel (N=128 in the present embodiment) audio signals corresponding to the number of channels of the first speaker device 10 are generated by the audio signal processing by the audio signal processing unit 321. The N-channel audio signals are output to the filter processing unit 322 and the mix processing unit 324.

Figure 5:
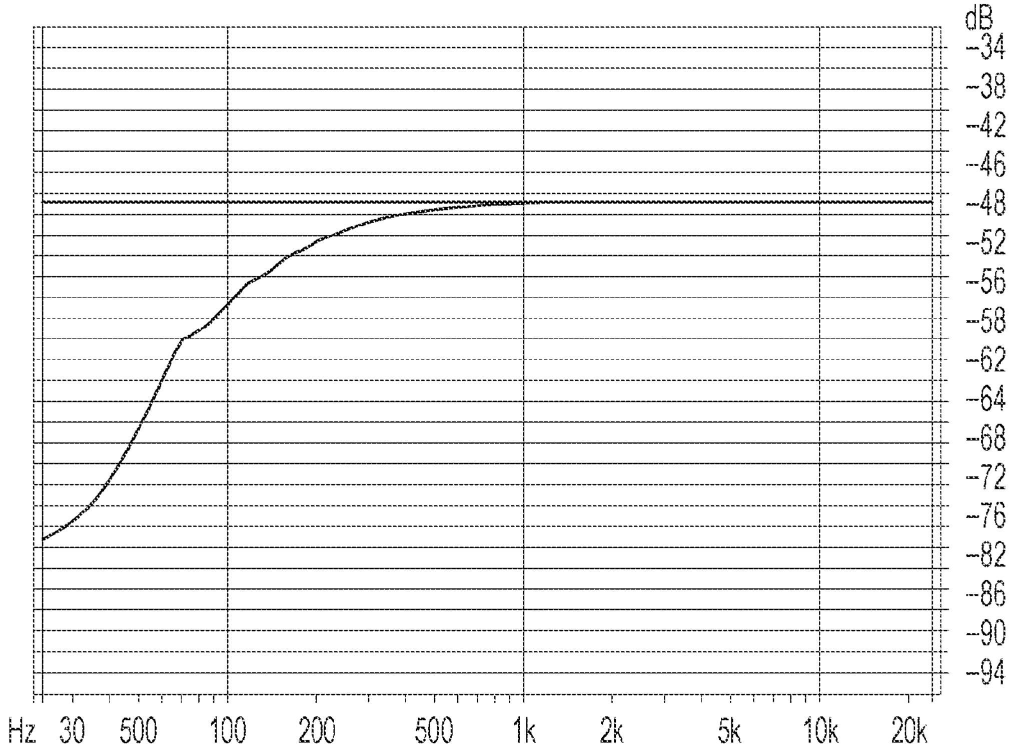
FIG. 5 is a diagram illustrating a characteristic of a filter included in a filter processing unit according to an embodiment of the present disclosure.

The filter processing unit 322 is, for example, a high-pass filter that cuts a low frequency of the N-channel audio signals. The filter processing unit 322 is configured by, for example, a first-order infinite impulse response (IIR) filter. The filter processing unit 322 may be configured by a finite impulse response (FIR) filter. A cutoff frequency of the filter processing unit 322 is set to, for example, a frequency between 100 and 200 Hz. In the present embodiment, the cutoff frequency of the filter processing unit 322 is set to 200 Hz. FIG. 5 illustrates a characteristic of a filter included in the filter processing unit 322 according to the present embodiment. By the filter processing by the filter processing unit 322, generation of abnormal sound caused by the limit of reproduction capability of the speaker SP described above and the like can be prevented, and the speaker SP can be protected. The N-channel audio signals to which the filter processing by the filter processing unit 322 has been applied are supplied to the first output unit 323.

The first output unit 323 is a terminal connected to the first speaker device 10, for example. The N-channel audio signals are output to the first speaker device 10 via the first output unit 323, and the N-channel audio signals are reproduced from the first speaker device 10.

The N-channel audio signals output from the audio signal processing unit 321 are supplied to the mix processing unit 324. Details of the processing performed by the mix processing unit 324 will be described below. The audio signals processed by the mix processing unit 324 are supplied to the second output unit 325.

The second output unit 325 is a terminal connected to the second speaker device 20, for example. X-channel audio signals are output to the second speaker device 20 via the second output unit 325, and the X-channel audio signals are reproduced by the second speaker device 20.

The setting information execution unit 326 performs control according to the setting information input via the operation input unit 33. Specifically, the setting information execution unit 326 controls a predetermined function of the signal processing unit 32 to execute setting corresponding to the setting information. Note that a specific example of the setting information and a specific operation of the setting information execution unit 326 associated therewith will be described below.

(Mix Processing Unit)

Next, specific content of mix processing performed by the mix processing unit 324 will be described with reference to FIGS. 6A, 6B, 7A, 7B, and 7C.

Figure 6A:
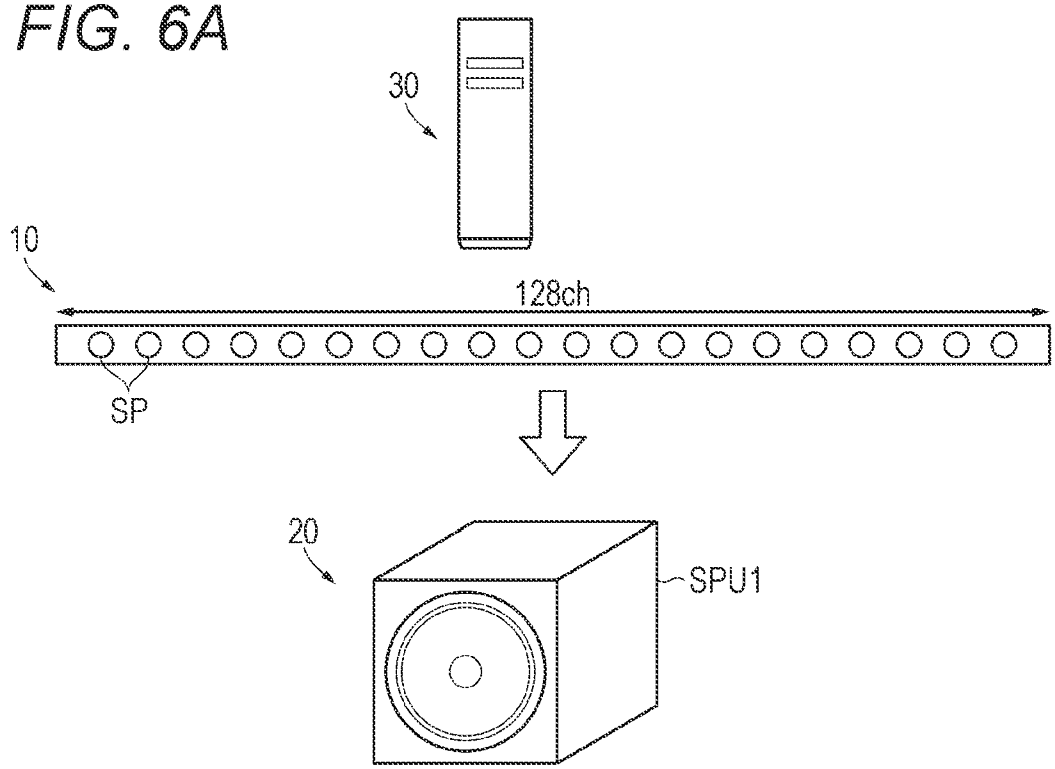
FIGS. 6A and 6B are diagrams that are referred to when describing a specific example of processing performed by a mix processing unit according to an embodiment of the present disclosure.
Figure 7A:
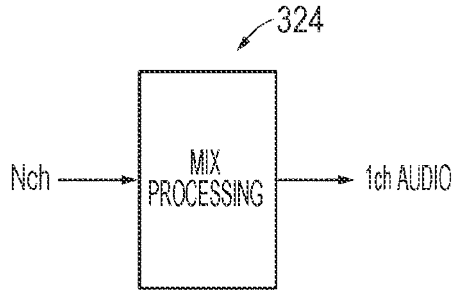
FIGS. 7A, 7B, and 7C are diagrams that are referred to when describing a specific example of processing performed by a mix processing unit according to an embodiment of the present disclosure.

For example, in a case where the second speaker device 20 includes one external speaker unit SPU1 (in the case of 1ch), as illustrated in FIG. 6A, the mix processing unit 324 performs mix processing of mixing all the N-channel audio signals supplied from the audio signal processing unit 321, that is, processing of synthesizing (superimposing, for example) the N-channel audio signals, thereby generating audio signals of a desired number of outputs (a desired number of channels), as illustrated in FIG. 7A. By such mixing processing, a 1ch audio signal is generated, for example. The generated 1ch audio signal is reproduced from the external speaker 21 after being processed by the external speaker signal processing unit 22 of the external speaker unit SPU1.

Figure 6B:
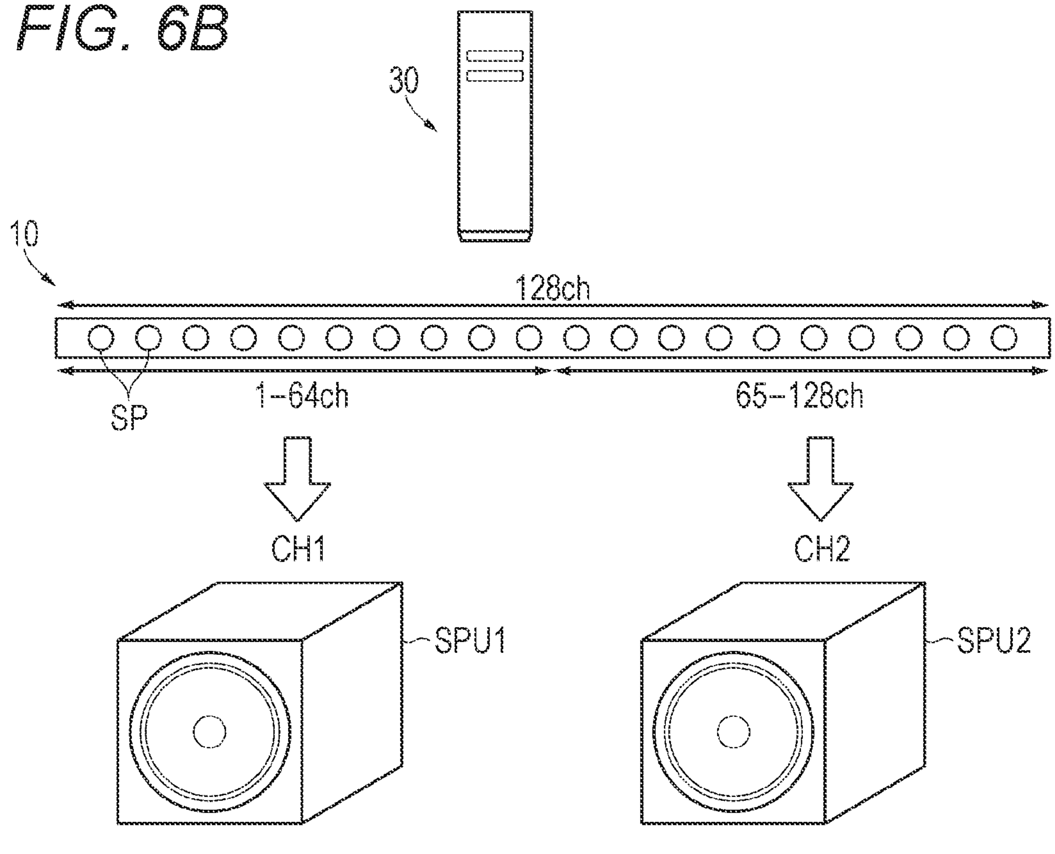
Figure 7B:
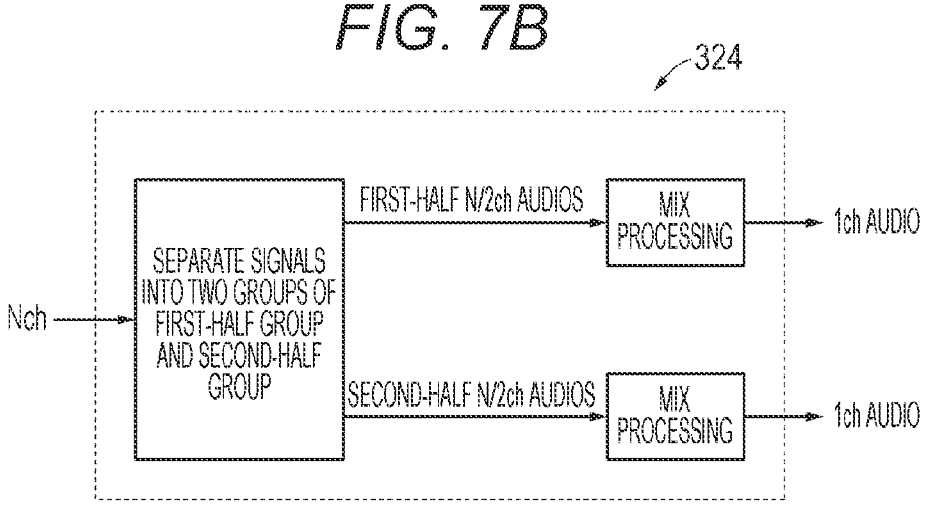

Furthermore, for example, in a case where the second speaker device 20 includes two external speaker units SPU1 and SPU2 (in the case of 2ch), as illustrated in FIG. 6B, the mix processing unit 324 separates the N-channel audio signals supplied from the audio signal processing unit 321 into two groups of first half group and second half group, as illustrated in FIG. 7B. For example, grouping based on the number of channels is performed. Specifically, among the N-channel audio signals, 1ch to 64ch audio signals are set as the first half group, and 65ch to 128ch audio signals are set as the second half group. Then, the first half (N/2) ch audio signals are mixed to generate a 1ch audio signal. The generated 1ch audio signal is reproduced from the external speaker 21 of the external speaker unit SPU1 after being processed by the external speaker signal processing unit 22 of the external speaker unit SPU1. Furthermore, the second half (N/2)ch audio signals are mixed to generate a 1ch audio signal. The generated 1ch audio signal is reproduced from the external speaker 21 of the external speaker unit SPU2 after being processed by the external speaker signal processing unit 22 of the external speaker unit SPU2.

Figure 7C:
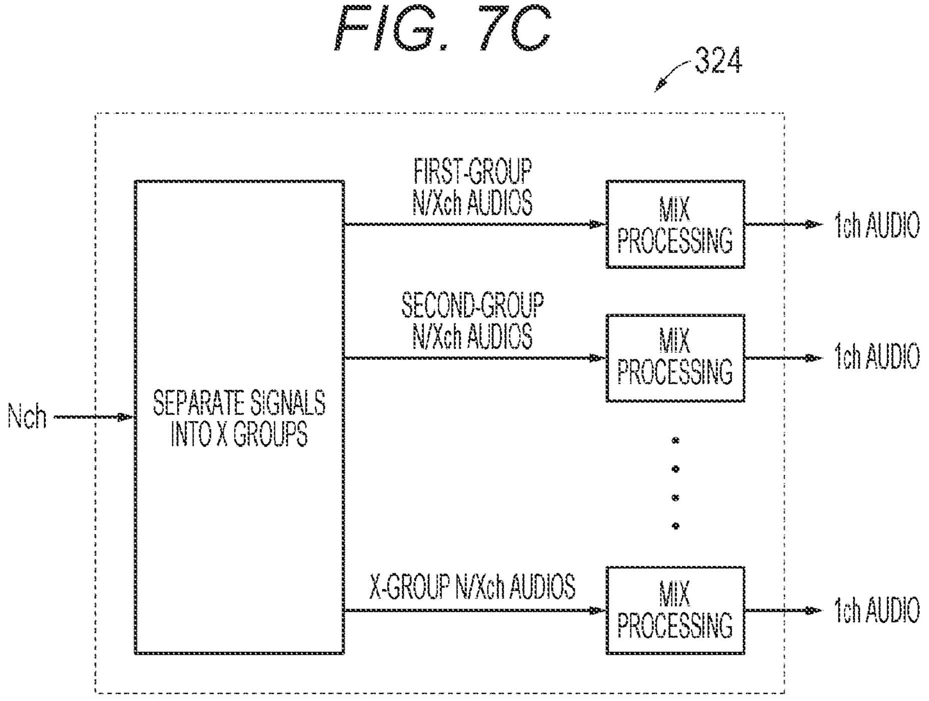

Generally speaking, in a case where the second speaker device 20 includes X-channel external speaker units SPU (SPU1 to SPUX), the mix processing unit 324 performs the mix processing after separating the N-channel audio signals into N/X-channel audio signals (see FIG. 7C).

The signal processing system 1 according to the present embodiment can reinforce a low frequency component, which the speaker array used for the wavefront synthesis processing are not good at reproducing, using the second speaker device 20. Therefore, the signal processing system 1 can suppress a loss of the feelings of a low frequency as much as possible and can enhance sound mellowness and can increase sound spread in the entire sound field.

[Setting Information]

In the signal processing system 1 according to the present embodiment, various settings are settable. The setting is performed using the operation input unit 33, for example. The operation input unit 33 generates setting information corresponding to an operation input, and supplies the generated setting information to the setting information execution unit 326. The setting information execution unit 326 performs control for executing processing based on the setting information. Such setting information includes information for settings regarding an output of the second speaker device 20, for example. Specific examples of the setting information include the following information. Note that, in the present embodiment, setting information I1, I3, and I4 corresponds to the information for settings regarding an output of the second speaker device 20. A plurality of pieces of setting information can be set.

(Specific Examples of Setting Information)

"Setting Information I1"

The setting information I1 is information regarding on/off of the sound source data to be output to the second speaker device 20. The setting information I1 can be set, for example, for each sound source data (regardless of the target sound source data or the non-target sound source data for the wavefront synthesis processing).

The sound source data set to ON as the setting information I1 is output from the second speaker device 20 after being mixed by the mix processing unit 324, and the sound source data set to OFF as the setting information I1 is not output from the audio signal processing unit 321 to the mix processing unit 324 and is not output from the second speaker device 20. The sound source data is selected by the audio signal processing unit 321 under the control of the setting information execution unit 326, for example.

"Setting Information I2"

The setting information I2 is information regarding on/off of the non-target sound source data for the wavefront synthesis processing (in the present embodiment, the sound source data of a BGM sound source) to be output to the first speaker device 10. The sound source data set to ON as the setting information I2 is output from the first speaker device 10 after being filtered by the filter processing unit 322, and the sound source data set to OFF as the setting information I2 is not output from the audio signal processing unit 321 to the filter processing unit 322 and is not output from the first speaker device 10. The sound source data is selected by the audio signal processing unit 321 under the control of the setting information execution unit 326, for example.

"Setting Information I3"

The setting information I3 is information regarding a set value of an equalizer set for individual sound source data. Note that the setting information I3 may be information set only for some sound source data instead of for all the sound source data. The setting information execution unit 326 supplies the sound source data and the set value of the equalizer corresponding to the setting information I3 to the audio signal processing unit 321. The audio signal processing unit 321 performs equalizer processing based on the set value indicated by the setting information I3, for the sound source data corresponding to the setting information I3. The equalizer processing is performed by the audio signal processing unit 321 under the control of the setting information execution unit 326, for example.

"Setting Information I4"

The setting information I4 is information regarding settings (adjustment) for a reproduction signal reproduced from the second speaker device 20, and is specifically information regarding a setting for at least one of gain adjustment, a cutoff frequency, a delay, a phase, or an equalizer.

The setting information execution unit 326 supplies the sound source data and the set value of the equalizer corresponding to the setting information I4 to the mix processing unit 324. The mix processing unit 324 performs processing based on the set value indicated by the setting information I4, for the signal after the mixing processing under the control of the setting information execution unit 326.

(Example of GUI)

The above-described setting information is set on the basis of an operation input by the user using a predetermined GUI, for example. The GUI may be displayed on a display included in the signal processing apparatus 30 or may be displayed on a device (a personal computer or a smartphone) different from the signal processing apparatus 30.

Figure 8:
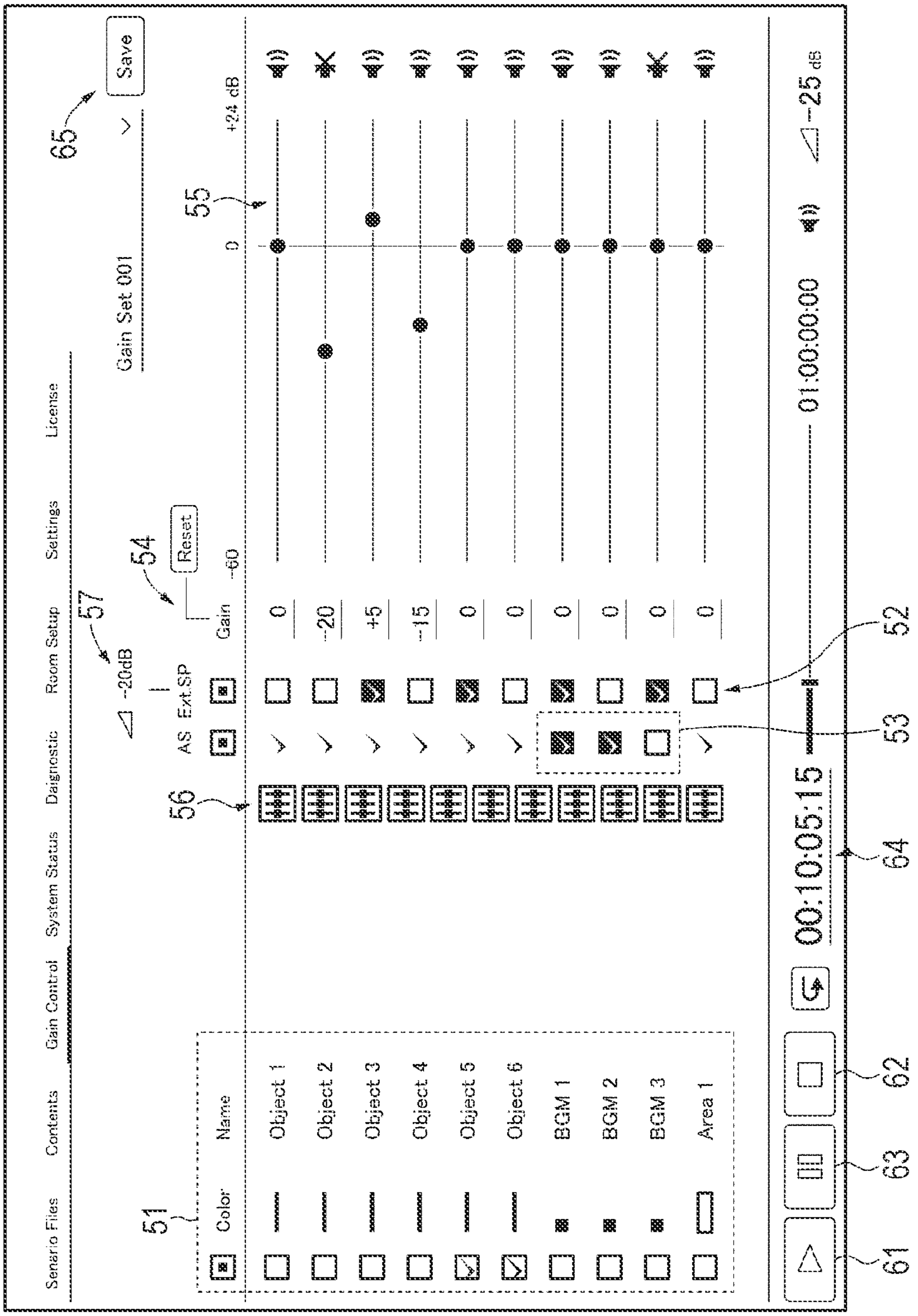
FIG. 8 is a diagram that is referred to when describing an example of a GUI that is used when setting setting information.

FIG. 8 is a diagram illustrating an example of a GUI. A list 51 of the sound source data is displayed on the left side in the GUI. The sound source data displayed in the list 51 is sound source data configuring one piece of content. An appropriate name can be set for each sound source data displayed in the list 51. The set name is displayed below the portion where "Name" is displayed. In the example illustrated in FIG. 8, "Object1", "Object2", . . . , and "Areal" are displayed. Note that "Area" means sound source data for which the wavefront synthesis processing is to be performed so that a reproduction area becomes a specific area.

Characters "Ext.SP" are displayed near the center of the GUI, and a check box 52 corresponding to each sound source data is displayed below the characters. "Ext.SP" means the second speaker device 20. The check box 52 is an item for setting the above-described setting information I1. The sound source data with the checked check box 52 (for example, "Object3") is set as sound source data to be reproduced from the second speaker device 20. The sound source data with the unchecked check box 52 (for example, "Object1") is set as sound source data not to be reproduced from the second speaker device 20. The setting information I1 can be set not only for the target sound source data for the wavefront synthesis processing but also for the non-target sound source data for the wavefront synthesis processing. In the example illustrated in FIG. 8, the non-target sound source data (for example, "BGM1") for the wavefront synthesis processing with the checked check box 52 is set as the sound source data to be reproduced from the second speaker device 20. The non-target sound source data (for example, "BGM2") for the wavefront synthesis processing with the unchecked check box 52 is set as the sound source data not to be reproduced from the second speaker device 20.

"AS" is displayed on the left side of "Ext.SP". "AS" means an active speaker, specifically, the first speaker device 10. Since all the sound source data of target objects for the wavefront synthesis processing are reproduced from the first speaker device 10, there is a check box at every position below characters "AS" and corresponding to the sound source data of each object. The setting information I2, which is a setting as to whether or not the sound source data is reproduced from the first speaker device 10, can be set for the non-target sound source data for the wavefront synthesis processing. In the example illustrated in FIG. 8, since the check boxes corresponding to the sound source data of "BGM1" and "BGM2" are checked, the sound source data are reproduced from the first speaker device 10. Meanwhile, since the check box corresponding to the sound source data of "BGM3" is unchecked, the sound source data is not reproduced from the first speaker device 10.

Characters 54 of "Gain" are displayed on the right side of "AS", and the gain for each sound source data can be set. Furthermore, a line extending in a cross direction and a black dot on the line are displayed on the right side of the word 54, corresponding to each sound source data. This display is a volume adjustment display 55. By moving the position of the black dot in the volume adjustment display 55 to the right and left, the volume for each sound source data can be adjusted between −60 to 24 dB, for example. The volume set on the volume adjustment display 55 acts on both the first speaker device 10 and the second speaker device 20. The volume set on the volume adjustment display 55 is set by, for example, a volume adjustment unit (not illustrated) provided in a preceding stage of the first output unit 323 and the second output unit 325.

Figure 9:
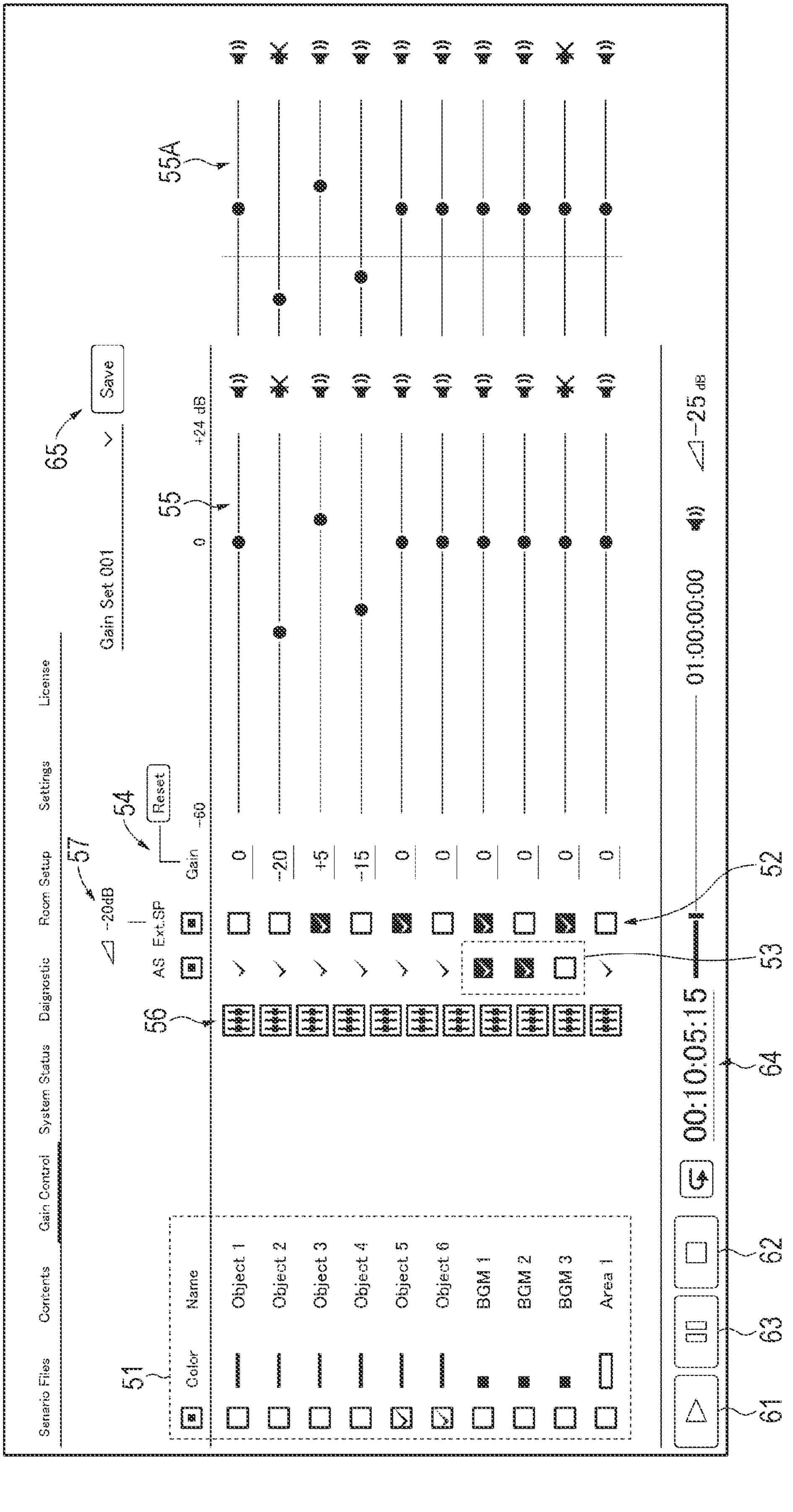
FIG. 9 is a diagram that is referred to when describing an example of a GUI that is used when setting setting information.

Note that, as illustrated in FIG. 9, a volume adjustment display 55A may be displayed on the right side of the volume adjustment display 55. The volume adjustment display 55A is a display for setting the volume applied only to the sound source data output from the second speaker device 20. Therefore, the setting on the volume adjustment display 55A is available only for the sound source data with the checked check box 52. The volume adjustment display 55A may be displayed so as to correspond only to the sound source data with the checked check box 52.

Figure 10:
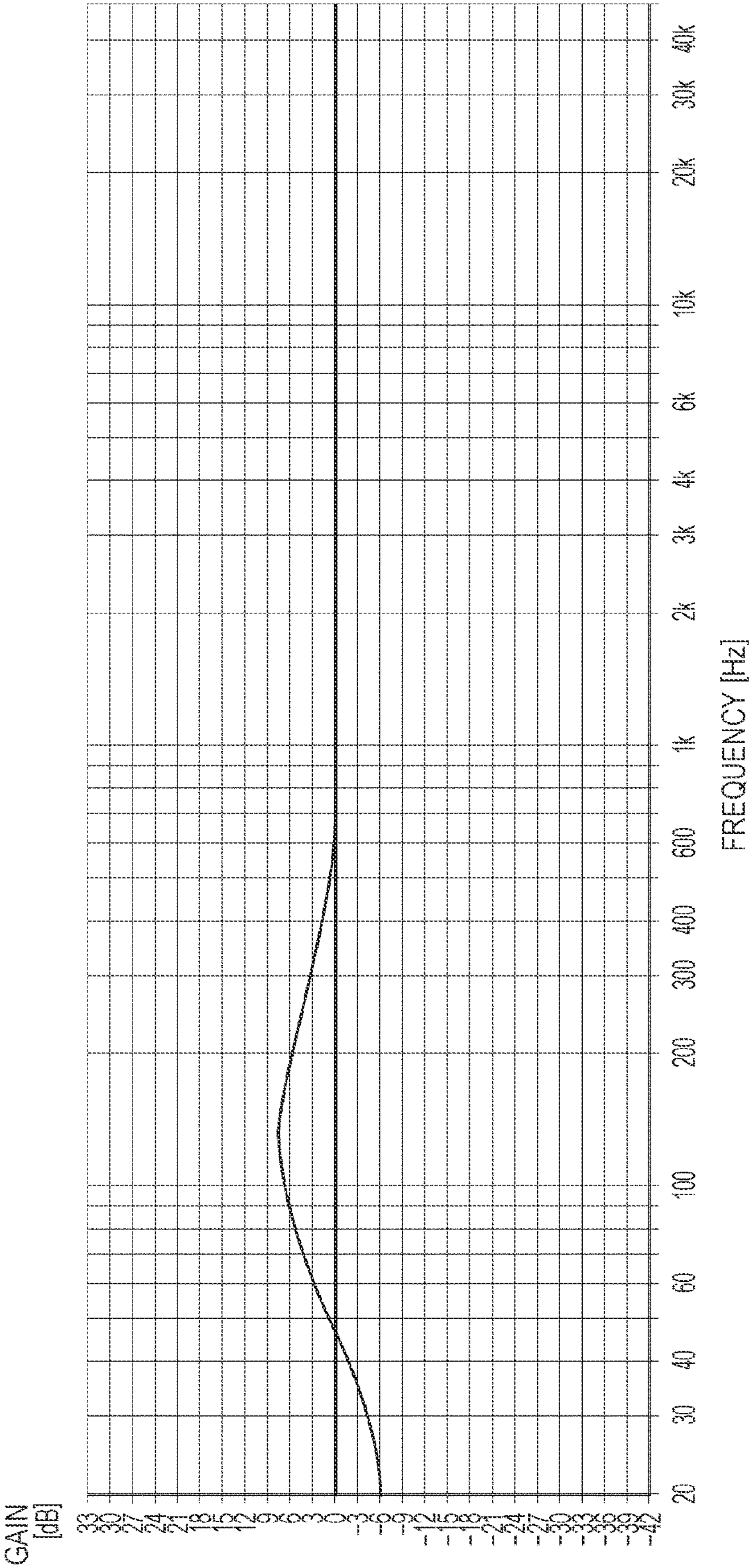
FIG. 10 is a diagram that is referred to when describing an example of a GUI that is used when setting setting information.

A mark 56 corresponding to each sound source data is displayed on the left side of the display of "AS". The mark 56 is a mark for setting the setting information I3. For example, when the mark 56 corresponding to the sound source data to be adjusted is clicked, the GUI screen transitions to a screen illustrated FIG. 10. The horizontal axis of the screen illustrated in FIG. 10 represents the frequency (Hz), and the vertical axis represents the gain (dB). The setting information I3 is set by the user appropriately adjusting the gain corresponding to the frequency using the operation input unit 33 using the screen illustrated in FIG. 10.

Figure 11:
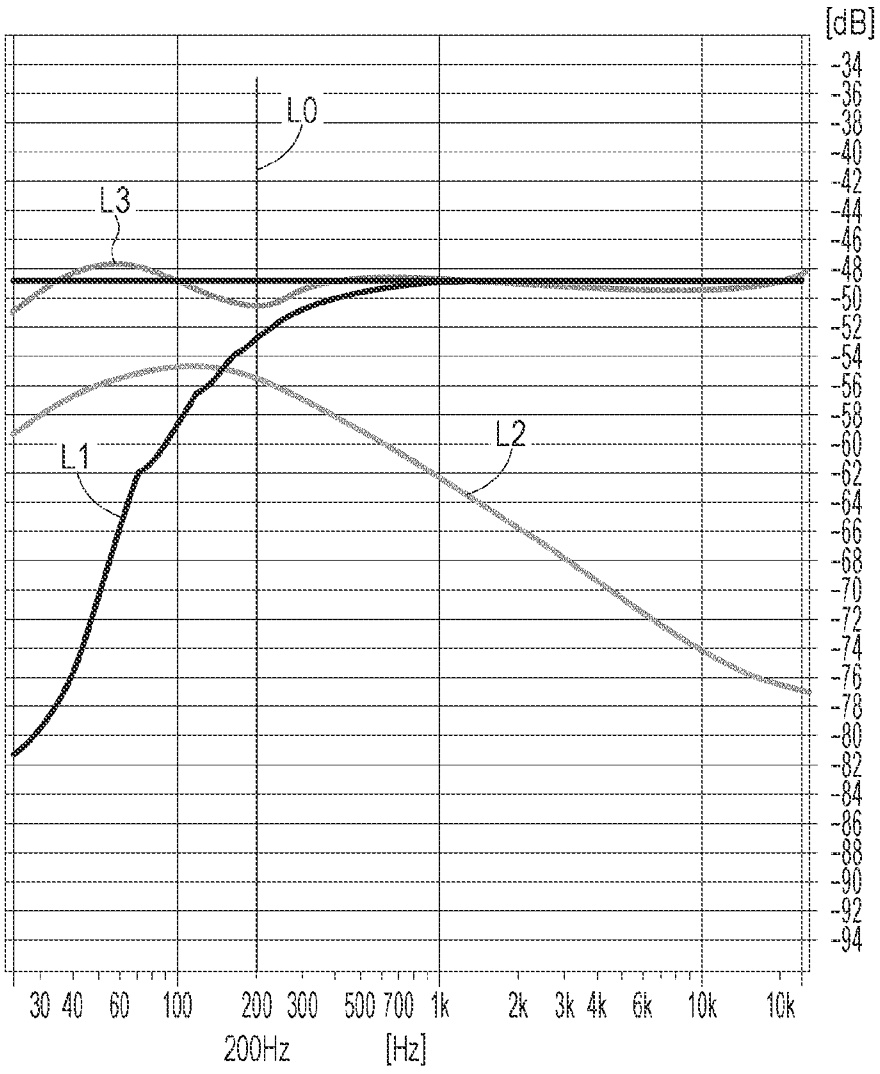
FIG. 11 is a diagram that is referred to when describing an example of a GUI that is used when setting setting information.

A display 57 including a triangular mark and characters "−20 dB" is displayed above the display of "Ext.SP". The display 57 is a display for adjusting a frequency characteristic of the entire sound field. When the display 57 is clicked or the like, the GUI screen transitions to a screen illustrated in FIG. 11. The horizontal axis on the screen illustrated in FIG. 11 represents the frequency (Hz), and the vertical axis represents the gain (dB). Furthermore, lines L0 to L3 are displayed on the screen illustrated in FIG. 11. The line L0 represents the cutoff frequency (for example, 200 Hz) of the second speaker device 20. The line L1 represents the frequency characteristic of the output of the first speaker device 10. The line L2 represents the frequency characteristic of the output of the second speaker device 20. The line L3 represents a frequency characteristic of the entire sound field including the first speaker device 10 and the second speaker device (a synthesized characteristic of the line L1 and the line L2).

The frequency characteristic of the line L2 is adjusted by the user setting the setting information I4, and the frequency characteristic illustrated by the line L3 is made as flat as possible, accordingly. For example, in the case where the first speaker device 10 and the second speaker device 20 are arranged such that the sound emission surfaces face each other, the user sets the setting information I4 while listening to sounds between the first speaker device 10 and the second speaker device 20.

Figure 12A:
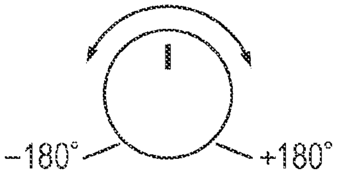
FIGS. 12A, 12B, and 12C are diagrams that are referred to when describing an example of a GUI that is used when setting setting information.
Figure 12B:
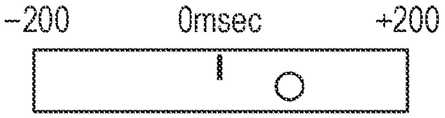
Figure 12C:
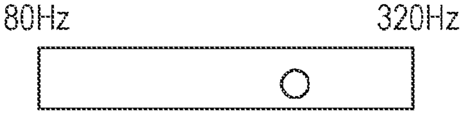

A specific example of a GUI for setting the setting information I4 will be described. As a GUI for adjusting the gain in a specific frequency region, a GUI similar to the GUI illustrated in FIG. 10 can be applied, for example. Furthermore, as a GUI capable of adjusting the phase, a dial-like GUI illustrated in FIG. 12A can be exemplified. The phase is adjusted by rotating the dial-like GUI in an appropriate direction. Furthermore, as a GUI capable of adjusting the delay, a GUI illustrated in FIG. 12B can be exemplified. The delay is adjusted by appropriately moving the round mark illustrated in FIG. 12B to the right and left. Furthermore, as a GUI capable of adjusting the cutoff frequency (crossover frequency), a GUI illustrated in FIG. 12C can be exemplified. The cutoff frequency is adjusted by appropriately moving the round mark illustrated in FIG. 12C to the right and left.

For example, the sound source data can be reproduced by clicking a reproduction button 61 in the GUI illustrated in FIG. 8 every time various settings described so far are made, and the effect of the settings can be confirmed. Furthermore, the GUI illustrated in FIG. 8 displays a button 62 for stopping reproduction, a button 63 for temporarily stopping reproduction, a reproduction time 64, characters 65 of "Save" for saving the settings, and the like.

Figure 13:
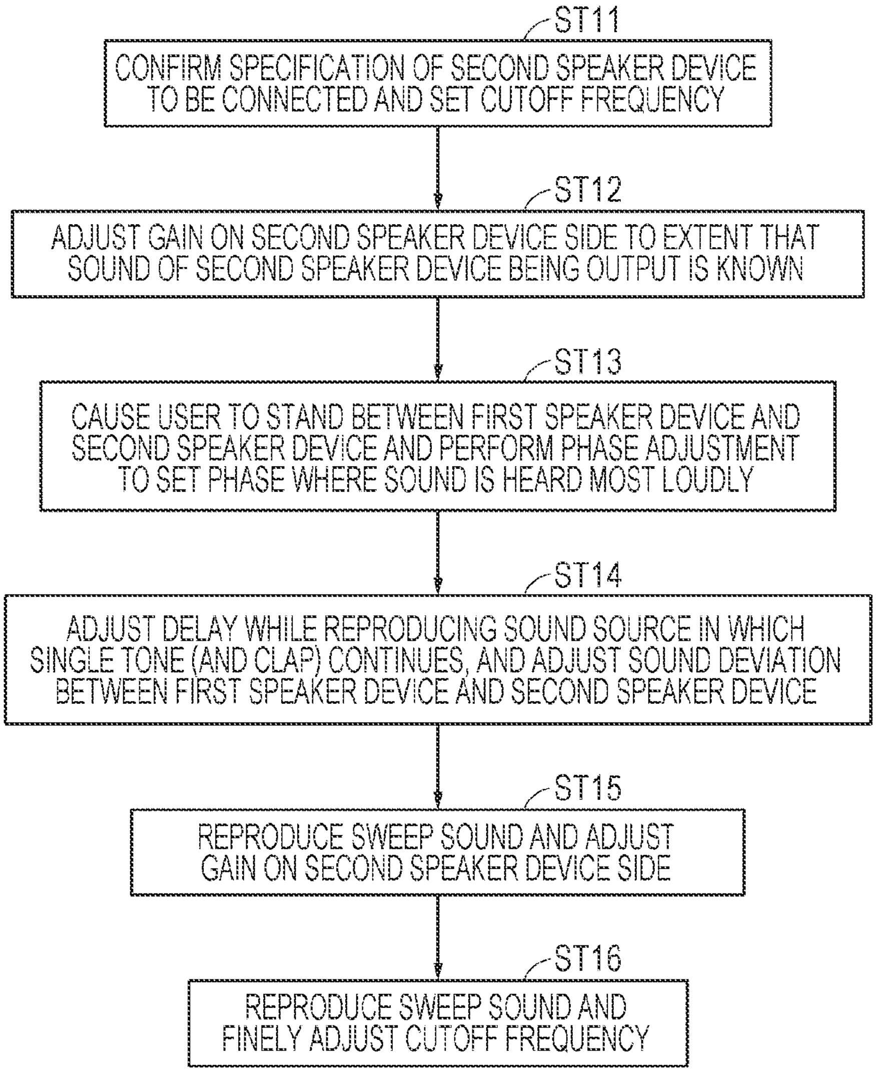
FIG. 13 is a flowchart illustrating a flow of processing when setting predetermined setting information.

FIG. 13 is a flowchart illustrating a flow of processing when setting setting information I4. In step ST11, the specification (spec) of the connected second speaker device 20 is confirmed, and the cutoff frequency corresponding to the specification is set. Then, the processing proceeds to step ST12.

In step ST12, the gain of the audio signal reproduced from the second speaker device 20 is adjusted to an extent that a sound being reproduced from the second speaker device 20 is known. Then, the processing proceeds to step ST13.

In step ST13, for example, the user stands between the first speaker device 10 and the second speaker device 20 and performs phase adjustment. As a result of the phase adjustment, the phase is set to a place where the sound is most loudly heard. Then, the processing proceeds to step ST14.

In step ST14, the delay is adjusted while reproducing a sound source in which a single tone continues, and sound deviation between the first speaker device 10 and the second speaker device 20 is adjusted (corrected). Then, the processing proceeds to step ST15.

In step ST15, a sweep sound is reproduced and the gain on the second speaker device 20 side is adjusted. Then, the processing proceeds to step ST16.

In step ST16, the sweep sound is reproduced and the cutoff frequency is finely adjusted. The above-described each adjustment processing is repeated as appropriate. Of course, each adjustment processing is not necessarily performed in a continuous manner, and each adjustment processing may be independently performed or only part of the adjustment processing may be performed.

As described above, since various types of setting information regarding the output of the second speaker device 20 and the like are made settable, rendering with sounds can be expanded. For example, since the setting information I1 is made settable, discrimination for each object sound source becomes possible, and a well-modulated sound field can be created.

Furthermore, since the setting information I2 is made possible, ON and OFF of reproduction from the first speaker device 10 and the second speaker device 20 can be freely combined for the sound source data that does not need sound image localization (the non-target sound source data for the wavefront synthesis processing) and more natural and rich sound expression becomes possible.

Furthermore, since the setting information I3 is made settable, the content creator's preference can be reflected in the sound source data of an individual object.

Furthermore, since the setting information I4 is made settable, the frequency characteristic of the entire sound field can be made flat.

<Modification>

An embodiment of the present disclosure has been specifically described. However, the content of the present disclosure is not limited to the above-described embodiment, and various modifications based on the technical idea of the present disclosure can be made. Hereinafter, modifications will be described.

Figure 14:
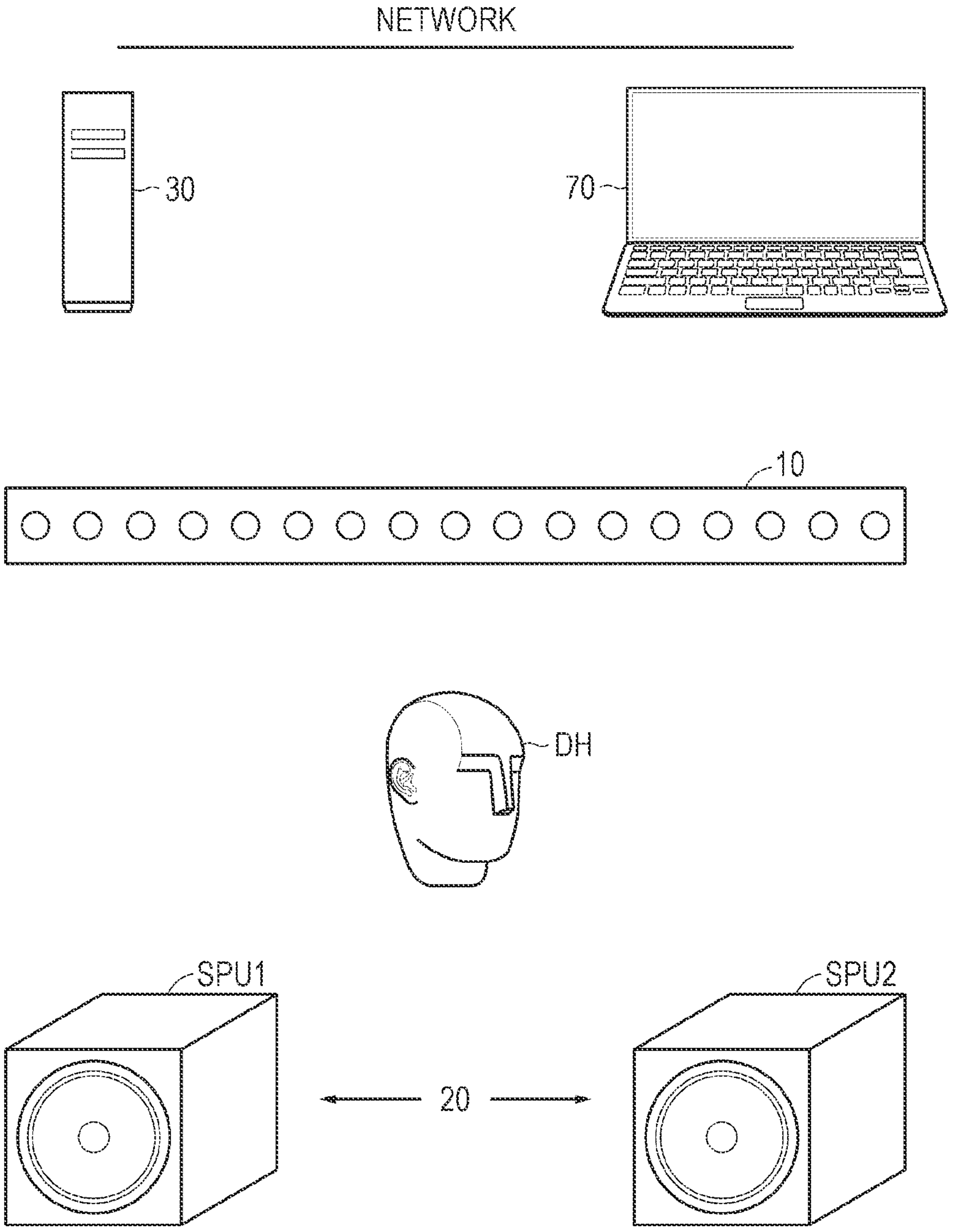
FIG. 14 is a diagram for describing a modification.

As illustrated in FIG. 14, the signal processing apparatus 30 and an external device (for example, a personal computer 70) may be remotely connected via a network such as the Internet. A dummy head DH equipped with a binaural microphone is disposed at a predetermined position of a sound field having the first speaker device 10 and the second speaker device 20 (for example, between the first speaker device 10 and the second speaker device 20). An audio collected by the microphone attached to the dummy head DH is transferred to the personal computer 70 by the signal processing apparatus 30 via the network. The personal computer 70 displays the above-described GUI. The user performs the above-described various adjustments using the GUI while listening to the audio transferred from the signal processing apparatus 30. Setting information obtained as a result of the adjustment is supplied to the signal processing apparatus 30 via the network and set in the signal processing apparatus 30. With such a configuration, even if the user is not in the actual sound field, the user can perform similar adjustment to a case where the user is at the site by remote control. Such a system can also be provided as a sound field adjustment service.

As described in the above-described embodiment, since the natural environmental sound, the spatial environmental sound, and the like are treated as the non-target sound source data for the wavefront synthesis processing, a more natural sound field can be realized. Note that the classification of the target and non-target sound source data for the wavefront synthesis processing is determined by adding attributes of the target and non-target sound source data to the program on the basis of the content creator's intention or can be automatically performed by the program analyzing the sound data. As a result of the analysis, classification to the non-target sound data for the wavefront synthesis processing being appropriate for sound data having a simple frequency configuration, sound data of repeated sound in which a similar waveform appears a plurality of times at fixed time intervals, and the like may be recommended to the user, for example.

In the above-described embodiment, the number of installed external speaker units SPU that are more compatible with the content may be recommended. For example, in a case where the sound source data of a plurality of objects is localized in the sound field and a state where the objects do not move continues, the frequency characteristic of the sound field can be maintained with high quality, so one external speaker unit SPU is simply recommended as the number of installed external speaker units SPU. Meanwhile, in the case of content in which the sound source data moves parallel to the speaker array in time series, two external speaker units SPU are recommended as the number of installed external speaker units SPU so that the second speaker device 20 can also assist the feelings of the movement. When the signal processing described in the embodiment is performed using the two external speaker units SPU, expression of sound followed by padding in accordance with the movement of an object sound source becomes possible.

In the above-described embodiment, the example in which the second speaker device 20 is configured by the woofer external speaker unit SPU has been described. However, the second speaker device 20 may be configured by a full-range SP. It is only necessary that an audio signal in a band that is cut at least in the system for the first speaker device 10 is reproduced from the external speaker unit SPU.

The present disclosure can also be realized by an apparatus, a method, a program, a system, or the like. For example, a program for performing the functions described in the embodiment is made downloadable, and a device not having the functions described in the embodiment downloads and installs the program, thereby becoming able to perform the control described in the embodiment. The present disclosure can also be realized by a server that distributes such a program. Furthermore, the items described in the embodiment and modification can be combined as appropriate. Furthermore, the content of the present disclosure is not construed in a limited manner by the effects exemplified in the present specification.

The present disclosure can also employ the following configurations.

(1)

A signal processing apparatus including:

an audio signal processing unit configured to perform wavefront synthesis processing for at least part of a plurality of sound source data;

a first output unit configured to output N-channel audio signals output from the audio signal processing unit to a first speaker device;

a mix processing unit configured to mix the N-channel audio signals output from the audio signal processing unit; and a second output unit configured to output an audio signal output from the mix processing unit to a second speaker device, in which a setting regarding an output of the second speaker device is possible.

(2)

The signal processing apparatus according to (1), in which, as the setting regarding an output of the second speaker device, a setting as to whether or not the plurality of sound source data is to be reproduced from the second speaker device is possible for each sound source data.

(3)

The signal processing apparatus according to (1) or (2), in which a setting as to whether or not sound source data that is not target sound source data for the wavefront synthesis processing is to be reproduced from the first speaker device is possible.

(4)

The signal processing apparatus according to (3), in which, in a case where there is a plurality of sound source data that is not target sound source data for the wavefront synthesis processing, a setting as to whether or not the plurality of sound source data is to be reproduced from the first speaker device is possible for each sound source data.

(5)

The signal processing apparatus according to any one of (1) to (4), in which, as the setting regarding an output of the second speaker device, a setting of an equalizer is possible for the each sound source data.

(6)

The signal processing apparatus according to any one of (1) to (5), in which, as the setting regarding an output of the second speaker device, at least one of adjustment regarding a gain for an audio signal reproduced from the second speaker device, a setting regarding a cutoff frequency, a setting regarding a delay, a setting of a phase, or a setting of an equalizer is possible.

(7)

The signal processing apparatus according to any one of (1) to (6), in which the setting regarding an output of the second speaker device is configured to be performed by a user.

(8)

The signal processing apparatus according to any one of (1) to (7), in which the setting regarding an output of the second speaker device is configured to be performed by remote control.

(9)

The signal processing apparatus according to any one of (1) to (8), in which, for the each sound source data, the each sound source data being either target sound source data or non-target sound source data for the wavefront synthesis processing is set.

(10)

The signal processing apparatus according to (9), in which sound source data being either target sound source data or non-target sound source data for the wavefront synthesis processing is automatically set.

(11)

A signal processing method including:

by an audio signal processing unit, performing wavefront synthesis processing for at least part of a plurality of sound source data;

by a first output unit, outputting N-channel audio signals output from the audio signal processing unit to a first speaker device;

by a mix processing unit, mixing the N-channel audio signals output from the audio signal processing unit; and by a second output unit, outputting an audio signal output from the mix processing unit to a second speaker device, in which a setting regarding an output of the second speaker device is possible.

(12)

A signal processing system including:

a first speaker device;

a second speaker device; and a signal processing apparatus to which the first speaker device and the second speaker device are connected, in which the signal processing apparatus includes an audio signal processing unit configured to perform wavefront synthesis processing for at least part of a plurality of sound source data, a first output unit configured to output N-channel audio signals output from the audio signal processing unit to the first speaker device, a mix processing unit configured to mix the N-channel audio signals output from the audio signal processing unit, and a second output unit configured to output an audio signal output from the mix processing unit to the second speaker device, and a setting regarding an output of the second speaker device is possible.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Signal processing system
10 First speaker device
20 Second speaker device
30 Signal processing apparatus
32 Signal processing unit
321 Audio signal processing unit
322 Filter processing unit
323 First output unit
324 Mix processing unit
325 Second output unit
326 Setting information execution unit
SPA Speaker array
SP Speaker
SPU External speaker unit

The invention claimed is:

1. A signal processing apparatus, comprising:

an audio signal processing unit configured to perform wavefront synthesis processing for at least part of a plurality of sound source data;

a first output unit configured to output N-channel audio signals output from the audio signal processing unit to a first speaker device;

a mix processing unit configured to mix the N-channel audio signals output from the audio signal processing unit; and a second output unit configured to output an audio signal output from the mix processing unit to a second speaker device, wherein a setting regarding reproduction of the audio output signal corresponds to a setting as to whether the plurality of sound source data is to be reproduced by the second speaker device.

2. The signal processing apparatus according to claim 1, wherein, as the setting regarding an output of the second speaker device, a setting as to whether or not the plurality of sound source data is to be reproduced from the second speaker device is possible for each sound source data.

3. The signal processing apparatus according to claim 1, wherein the setting corresponds to a setting as to whether or not sound source data that is not target sound source data for the wavefront synthesis processing is to be reproduced from the first speaker device.

4. The signal processing apparatus according to claim 3, wherein, in a case where there is a plurality of sound source data that is not target sound source data for the wavefront synthesis processing, the setting corresponds to a setting as to whether or not the plurality of sound source data is to be reproduced from the first speaker device for each sound source data.

5. The signal processing apparatus according to claim 1, wherein, as the setting regarding an output of the second speaker device, a setting of an equalizer is possible for the each sound source data.

6. The signal processing apparatus according to claim 1, wherein, as the setting regarding an output of the second speaker device, at least one of adjustment regarding a gain for an audio signal reproduced from the second speaker device, a setting regarding a cutoff frequency, a setting regarding a delay, a setting of a phase, or a setting of an equalizer is possible.

7. The signal processing apparatus according to claim 1, wherein the setting regarding an output of the second speaker device is configured to be performed by a user.

8. The signal processing apparatus according to claim 1, wherein the setting regarding an output of the second speaker device is configured to be performed by remote control.

9. The signal processing apparatus according to claim 1, wherein, for the each sound source data, the each sound source data is one of target sound source data or non-target sound source data for the wavefront synthesis processing is set.

10. The signal processing apparatus according to claim 9, wherein sound source data is one of target sound source data or non-target sound source data for the wavefront synthesis processing is automatically set.

11. A signal processing method, comprising:

by an audio signal processing unit, performing wavefront synthesis processing for at least part of a plurality of sound source data;

by a first output unit, outputting N-channel audio signals output from the audio signal processing unit to a first speaker device;

by a mix processing unit, mixing the N-channel audio signals output from the audio signal processing unit; and by a second output unit, outputting an audio signal output from the mix processing unit to a second speaker device, wherein a setting regarding reproduction of the audio output signal corresponds to a setting whether the plurality of sound source data is to be reproduced by the second speaker device is possible.

12. A signal processing system, comprising:

a first speaker device;

a second speaker device; and a signal processing apparatus to which the first speaker device and the second speaker device are connected, wherein the signal processing apparatus includes:

an audio signal processing unit configured to perform wavefront synthesis processing for at least part of a plurality of sound source data, a first output unit configured to output N-channel audio signals output from the audio signal processing unit to the first speaker device, a mix processing unit configured to mix the N-channel audio signals output from the audio signal processing unit, and a second output unit configured to output an audio signal output from the mix processing unit to the second speaker device, and a setting regarding reproduction of the audio output signal corresponds to a setting whether the plurality of sound source data is to be reproduced by the second speaker device is possible.

* * * * *